United States Patent
Lin et al.

(10) Patent No.: US 12,326,540 B2
(45) Date of Patent: Jun. 10, 2025

(54) METALENS AND IMAGE SENSOR

(71) Applicant: GUANGZHOU LUXVISIONS INNOVATION TECHNOLOGY LIMITED, Guangzhou (CN)

(72) Inventors: Tzu-Yao Lin, Guangzhou (CN); Shih-Chieh Yen, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 326 days.

(21) Appl. No.: 17/989,699

(22) Filed: Nov. 18, 2022

(65) Prior Publication Data
US 2024/0125982 A1    Apr. 18, 2024

(30) Foreign Application Priority Data
Oct. 12, 2022 (TW) .................. 111138617

(51) Int. Cl.
*G02B 1/00* (2006.01)
*G02B 3/08* (2006.01)

(52) U.S. Cl.
CPC .............. *G02B 1/002* (2013.01); *G02B 3/08* (2013.01)

(58) Field of Classification Search
CPC ........ G02B 3/08; G02B 1/002; G02B 3/0043; G02B 3/0056; G02B 2207/101; G02B 5/1809; G02B 27/0172; G02B 1/005; G02B 5/1876; G02B 5/18; G02B 5/1871; B82Y 20/00; H01L 27/14627; G02F 2202/30; G02F 2202/36
See application file for complete search history.

(56) References Cited

U.S. PATENT DOCUMENTS

| | | | | |
|---|---|---|---|---|
| 2016/0219228 A1* | 7/2016 | Kintz | ..................... | H04N 23/23 |
| 2018/0309039 A1* | 10/2018 | Hussein | ............... | H10N 10/857 |
| 2020/0174163 A1* | 6/2020 | Han | ....................... | G02B 1/002 |
| 2021/0099681 A1* | 4/2021 | Yamada | ............... | G02B 5/1866 |
| 2022/0011567 A1* | 1/2022 | Carminati | ............ | G02B 26/101 |
| 2023/0239552 A1* | 7/2023 | Miyata | ............. | H01L 27/14627 |
| | | | | 348/272 |

(Continued)

FOREIGN PATENT DOCUMENTS

| | | |
|---|---|---|
| CN | 107966824 | 4/2018 |
| CN | 110677575 | 1/2020 |
| CN | 112702545 | 4/2021 |

(Continued)

OTHER PUBLICATIONS

"Office Action of China Counterpart Application No. 202211395123.0", issued on Apr. 11, 2025, p. 1-p. 9.

(Continued)

*Primary Examiner* — Pinping Sun
*Assistant Examiner* — Matthew Y Lee
(74) *Attorney, Agent, or Firm* — JCIPRNET

(57) ABSTRACT

A metalens including a transparent substrate and lenses is provided. The lenses are located on the transparent substrate. Each of the lenses includes first columnar microstructures continuously arranged along a first direction and second columnar microstructures continuously arranged along a second direction. A pitch of the first columnar microstructure is different from a pitch of the second columnar microstructure.

8 Claims, 6 Drawing Sheets

(56) References Cited

U.S. PATENT DOCUMENTS

2023/0280694 A1* 9/2023 Rho .......................... G06F 1/26
2024/0210246 A1* 6/2024 Rubin .................. G02B 5/3058

FOREIGN PATENT DOCUMENTS

| TW | I354809 | 12/2011 |
| TW | I391707 | 4/2013 |
| TW | I705281 | 9/2020 |
| TW | I773070 | 8/2022 |
| TW | 202238178 | 10/2022 |
| TW | I779564 | 10/2022 |

OTHER PUBLICATIONS

"Office Action of Taiwan Counterpart Application", issued on Aug. 29, 2023, p. 1-p. 6.

* cited by examiner

METALENS AND IMAGE SENSOR

CROSS-REFERENCE TO RELATED APPLICATION

This application claims the priority benefit of Taiwan application serial no. 111138617, filed on Oct. 12, 2022. The entirety of the above-mentioned patent application is hereby incorporated by reference herein and made a part of this specification.

BACKGROUND

Technical Field

The disclosure relates to a metalens and an image sensor.

Description of Related Art

In recent years, with the development of high-resolution image sensing techniques, structure design and process techniques of various image sensors have been continuously proposed. Conventional image sensing modules often use a large curvature lens to improve the focusing effect of the light. However, the lens with a large curvature is prone to aberration. Thus, an additional compensation lens is needed to correct the deformation of the image, resulting in the overall thickness of the image sensor becoming thicker. In addition, conventional lenses and color filter arrays have limited optical capabilities, making them difficult to integrate into the system.

SUMMARY

The disclosure provides a metalens that may improve the photoelectric conversion efficiency of an image sensor.

The disclosure provides a photodetector with an advantage of high photoelectric conversion efficiency.

At least one embodiment of the disclosure provides a metalens. The metalens includes a transparent substrate and multiple lenses. The lenses are located on the transparent substrate. Each of the lenses includes multiple first columnar microstructures arranged continuously along a first direction and multiple second columnar microstructures arranged continuously along a second direction. A pitch of the first columnar microstructure is different from a pitch of the second columnar microstructure.

At least one embodiment of the disclosure provides an image sensor. The image sensor includes the metalens and a photosensitive device substrate overlapping the metalens.

Based on the above, since the pitch of the first columnar microstructure of metalens is different from the pitch of the second columnar microstructure, the metalens may focus incidence ray lines of different wavelengths onto different positions on the photosensitive device substrate, thereby improving the photoelectric conversion efficiency of the image sensor.

DESCRIPTION OF THE EMBODIMENTS

Figure 1:
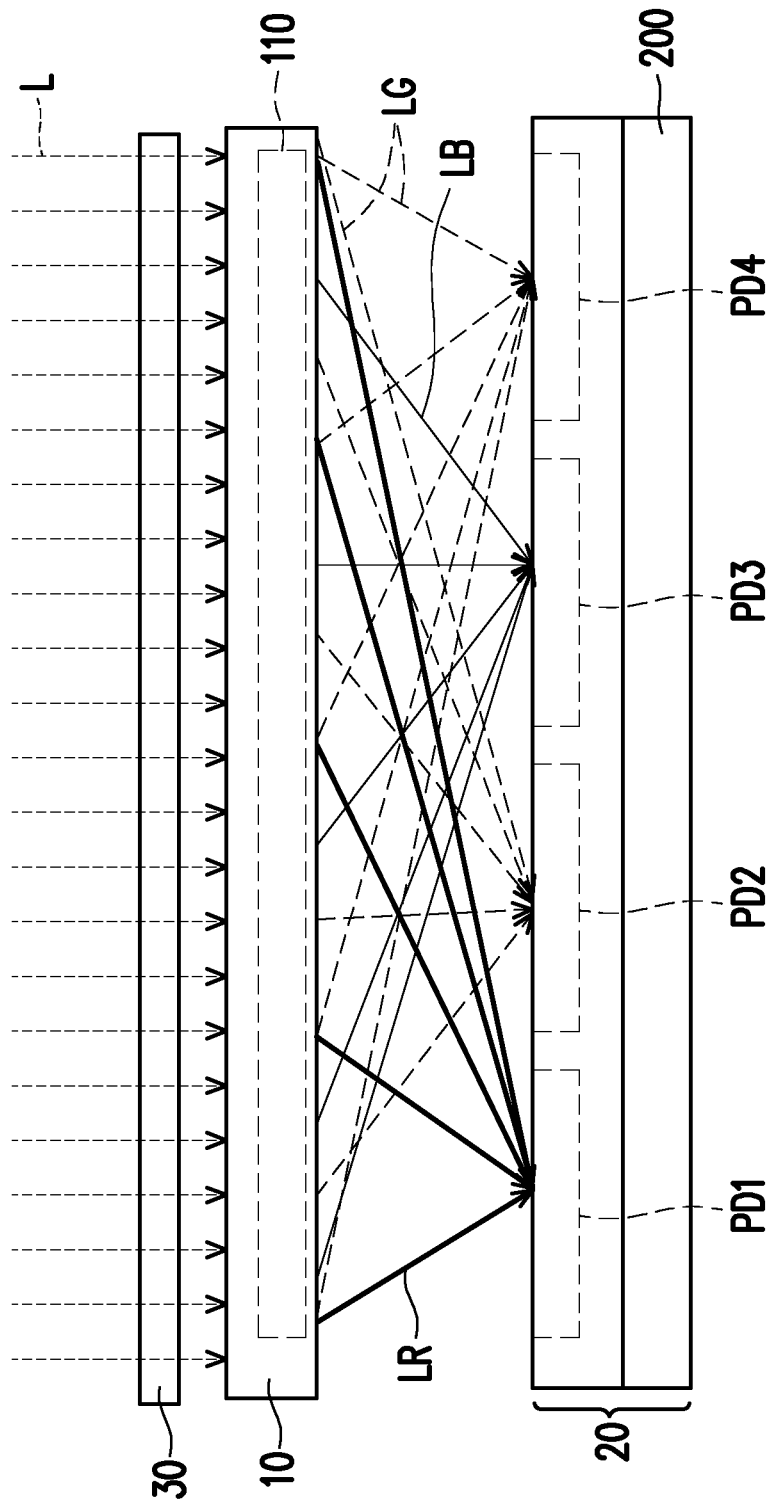
FIG. 1 is a cross-sectional schematic view of an image sensor according to an embodiment of the disclosure.

FIG. 1 is a cross-sectional schematic view of a photodetector according to an embodiment of the disclosure. Referring to FIG. 1, an image sensor 1 includes a metalens 10 and a photosensitive device substrate 20 overlapping the metalens 10. In some embodiments, the image sensor 1 further includes a color filter array 30. The color filter array 30 is disposed outside the metalens 10 and is configured to filter light of a specific wavelength. For example, the color filter array 30 is an infrared color filter array, and the color filter array 30 is configured to block infrared light.

The metalens 10 includes multiple lenses 110. In FIG. 1A, the specific structure of the lens 110 is omitted and the specific structure of the lens 110 is described later. The metalens 10 may manipulate a wavefront of an electromagnetic wave through a secondary wavelength structure. By combining a dynamic phase and a geometric phase, it is possible to change a direction of incident light in a visible wavelength within one micrometer, thereby guiding the light to a corresponding photosensitive device. Each of the lenses 110 includes multiple columnar microstructures (not shown) provided with two or more pitch, length, arrangement direction, and/or height. By adjusting the pitch, the length, the arrangement direction, and/or the height of the columnar microstructure, light of different wavelengths is directed to different positions. In some embodiments, the metalens 10 has a focal length of 200 micrometers to 400 micrometers.

The photosensitive device substrate 20 includes a substrate 200 and multiple pixels PX on the substrate 200. Each of the pixels PX overlaps with a corresponding lens 110. Each of the pixels PX includes multiple photosensitive devices. For example, in this embodiment, one pixel PX includes a photosensitive device PD1, a photosensitive device PD2, a photosensitive device PD3, and photosensitive device PD4. The photosensitive device PD1, the photosensitive device PD2, the photosensitive device PD3, and the photosensitive device PD4 are configured to receive lights of the same or different colors. For example, the photosensitive device PD1, the photosensitive device PD2, and the photosensitive device PD3 are configured to receive red light LR, green light LG, and blue light LB, respectively, while the photosensitive device PD4 is configured to receive green light LG.

In some embodiments, the pixels PX in the photosensitive device substrate 20 are arrayed on the substrate 200 in a Bayer pattern. To keep things simple, FIG. 1A only shows one of the pixels PX. In addition, although in FIG. 1A, the photosensitive device PD1, the photosensitive device PD2, the photosensitive device PD3, and the photosensitive device PD4 are arranged in a row, the disclosure does not limit the arrangement of the photosensitive device PD1, the photosensitive device PD2, the photosensitive device PD3, and the photosensitive device PD4 in a single pixel PX. In other words, the arrangement of the photosensitive device PD1, the photosensitive device PD2, the photosensitive device PD3, and the photosensitive device PD4 in a single pixel PX may be determined according to actual requirements. In addition, shapes and areas of the photosensitive device PD1, the photosensitive device PD2, the photosensitive device PD3, and the photosensitive device PD4 may also be determined according to actual requirements. In some embodiments, the photosensitive device PD1, the photosensitive device PD2, the photosensitive device PD3, and the photosensitive device PD4 are complementary metal-oxide-semiconductor photosensitive devices, but the disclosure is not limited thereto. The photosensitive device PD1, the photosensitive device PD2, the photosensitive device PD3, and the photosensitive device PD4 may also be other types of photosensitive devices.

In this embodiment, microstructures in the metalens 10 may focus light of different wavelengths onto different positions on the photosensitive device substrate 20. For example, white light L is divided into red light LR, green light LG, and blue light LB after passing through the metalens 10. The red light LR is directed to the photosensitive device PD1, the green light LG is directed to the photosensitive device PD2 and the photosensitive device PD4, and the blue light LB is directed to the photosensitive device PD3.

Based on the above, by replacing a micro lens array and the color filter array with the metalens 10, an overall thickness of the image sensor 1 may be reduced. In addition, since the metalens 10 does not absorb light as much as the color filter array, the photoelectric conversion efficiency of the image sensor 1 may be improved by using the metalens 10.

Figure 2A:
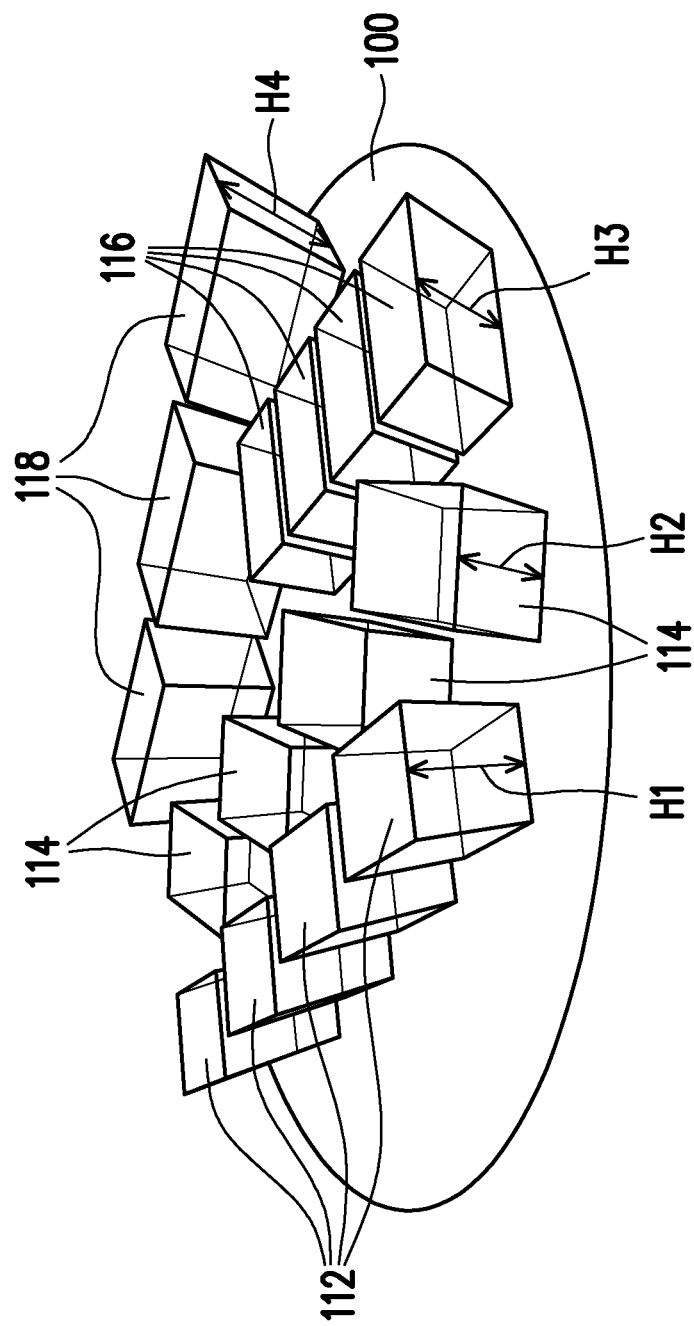
FIG. 2A is a perspective schematic view of a metalens according to an embodiment of the disclosure.
Figure 2B:
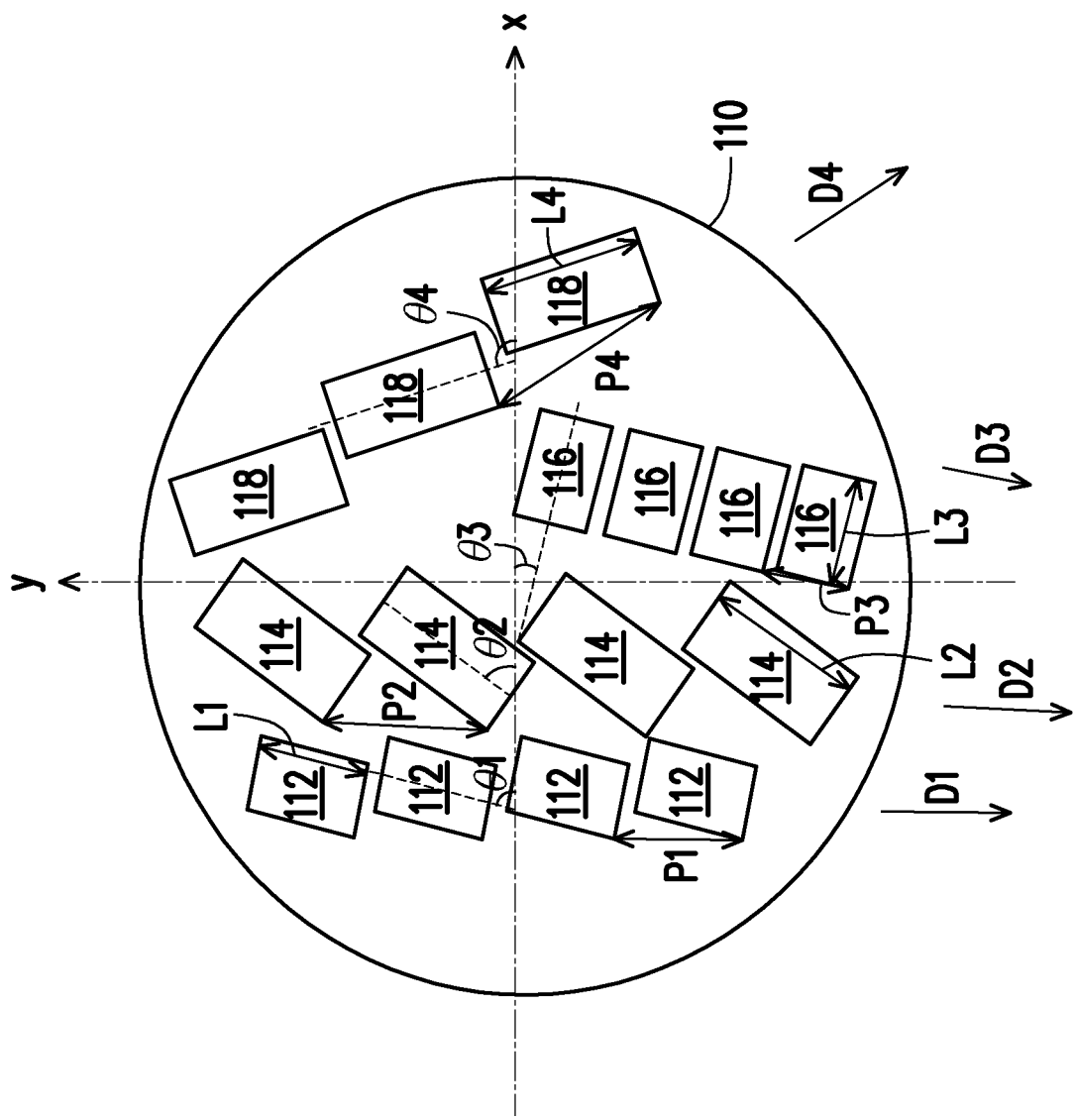
FIG. 2B is a schematic top view of the metalens of FIG. 2A.

FIG. 2A is a perspective schematic view of a metalens according to an embodiment of the disclosure. FIG. 2B is a schematic top view of the metalens of FIG. 2A. For example, the metalens of FIG. 2A and FIG. 2B are one of the states of the metalens 10 of FIG. 1. Referring to FIG. 2A and FIG. 2B, the metalens 10 includes a transparent substrate 100 and multiple lenses 110. One of the lenses 110 of the metalens 10 is shown in FIG. 2A and FIG. 2B. The material of the transparent substrate 100 is, for example, glass, quartz, organic material (e.g., plastic material), or other suitable materials.

The lenses 110 are located on the transparent substrate 100. In some embodiments, a surface of the transparent substrate 100 includes one or more buffer layers, and the lenses 110 are formed on the aforementioned buffer layers.

Each of the lenses 110 includes multiple first columnar microstructures 112 continuously arranged along a first direction D1, multiple second columnar microstructures 114 arranged continuously along a second direction D2, multiple third columnar microstructures 116 arranged continuously along a third direction D3, and multiple fourth columnar microstructures 118 arranged continuously along a fourth direction D4. In some embodiments, the first direction D1, the second direction D2, the third direction D3, and the fourth direction D4 are the same or different from each other.

A first pitch P1 is provided between adjacent first columnar microstructures 112, a second pitch P2 is provided between adjacent second columnar microstructures 114, a third pitch P3 is provided between adjacent third columnar microstructures 116, and a fourth pitch P4 is provided between adjacent fourth columnar microstructures 118. In some embodiments, the first pitch P1, the second pitch P2, the third pitch P3, and the fourth pitch P4 are the same or different from each other.

The first columnar microstructure 112 has a first height H1, the second columnar microstructure 114 has a second height H2, the third columnar microstructure 116 has a third height H3, and the fourth columnar microstructure 118 has a fourth height H4. In some embodiments, the first height H1, the second height H2, the third height H3, and the fourth height H4 are the same or different from each other.

Referring to FIG. 2B, a dummy y-axis and a dummy x-axis are set to define a direction of a central axis of the columnar microstructure. An orthographic projection of each of the first columnar microstructures 112 onto the transparent substrate 100 is a first rectangle. A first included angle $\theta 1$ is provided between a central axis of the first rectangle and the dummy x-axis. An orthographic projection of each of the second columnar microstructures 114 onto the transparent substrate 100 is a second rectangle. A second included angle $\theta 2$ is provided between a central axis of the second rectangle and the dummy x-axis. An orthographic projection of each of the third columnar microstructures 116 onto the transparent substrate 100 is a third rectangle. A third included angle $\theta 3$ is provided between a central axis of the third rectangle and the dummy x-axis. An orthographic projection of each of the fourth columnar microstructures 118 onto the transparent substrate 100 is a fourth rectangle. A fourth included angle $\theta 4$ is provided between a central axis of the fourth rectangle and the dummy x-axis. In some embodiments, the first included angle $\theta 1$, the second included angle $\theta 2$, the third included angle $\theta 3$, and the fourth included angle $\theta 4$ are the same or different from each other. Furthermore, the first rectangle, the second rectangle, the third rectangle, and the fourth rectangle have a first length L1, a second length L2, a third length L3, and a fourth length L4, respectively. In some embodiments, the first length L1, the second length L2, the third length L3, and the fourth length L4 are the same or different from each other.

In some embodiments, by adjusting the arrangement direction, the pitch, the height, the rotating angle, and/or the length of different rows of columnar microstructure, light of different wavelengths is directed to different positions, respectively. For example, in some embodiments, the first pitch P1 of the first columnar microstructure 112 is 100 nanometers, the first height H1 is 1 micrometer, and the first included angle $\theta 1$ is 50 to 70 degrees, thereby making the first columnar microstructure 112 suitable for refracting green light to the corresponding photosensitive device PD2 (referring to FIG. 1). The second pitch P2 of the second columnar microstructure 114 is 150 nanometers, the second height H2 is 800 nanometers, and the second included angle $\theta 2$ is 30 to 50 degrees, thereby making the second columnar microstructure 114 suitable for refracting red light to the corresponding photosensitive device PD1 (referring to FIG. 1). The third pitch P3 of the third columnar microstructure 116 is 80 nanometers, the third height H3 is 700 nanometers, and the third included angle $\theta 3$ is −10 to −30 (which equals to 350 to 330) degrees, thereby making the third columnar microstructure 116 suitable for refracting blue light to the corresponding photosensitive device PD3 (referring to FIG. 1). The fourth pitch P4 of the fourth columnar microstructure 118 is 150 nanometers, the fourth height H4 is 1 micrometer, and the fourth included angle $\theta 4$ is 90 to 110 degrees, thereby making the fourth columnar microstructure 118 suitable for refracting green light to the corresponding photosensitive device PD4 (referring to FIG. 1). In the above examples, the first pitch P1, the second pitch P2, and the third pitch P3 are different from each other, while the second pitch P2 and the fourth pitch P4 are equal, but the disclosure is not limited thereto. In the foregoing example, the first height H1, the second height H2 and the third height H3 are different from each other, and the first height H1 and the fourth height H4 are equal, but the disclosure is not limited to this.

In some embodiments, materials of the first columnar microstructure 112, the second columnar microstructure 114, the third columnar microstructure 116, and the fourth columnar microstructure 118 include gallium arsenide (GaN), titanium dioxide (TiO$_2$), or other suitable materials. In some embodiments, the use of titanium dioxide, which has a higher refractive index than gallium arsenide, allows the metalens 10 to have stronger phase modulation over a wavefront of the light and reduces the thickness of the metalens 10. In addition, absorption loss of titanium dioxide is small, so that the image sensor 1 may have higher photoelectric conversion efficiency. In some embodiments, external quantum efficiencies of image sensor 1 for light at wavelengths of 457 nanometers, 532 nanometers, and 633 nanometers are about 80%, 85%, and 45%, respectively.

In some embodiments, respective configurations of the first columnar microstructure 112, the second columnar microstructure 114, the third columnar microstructure 116, and the fourth columnar microstructure 118 in a single lens 110 may be calculated by finite element analysis. A smallest unit to modulate the light phase may be obtained by finite element analysis. In addition, by combining with the dynamic phase, a number of repetitions required for the columnar microstructure in a single lens 110 may be greatly reduced while maintaining the focusing effect of the lens 110. For example, in this embodiment, a single lens 110 has four first columnar microstructures 112, four second columnar microstructures 114, four third columnar microstructures 116, and three fourth columnar microstructures 118. In addition, due to the addition of the dynamic phase, metalens 10 has a better focusing effect within the same area, so a smaller focusing light spot is obtained. On the other hand, the focal length of the metalens 10 is reduced due to the addition of dynamic phase. In Mathematical Formula 1, DOF is a depth of field, u is an object distance, N is a F-number (focal ratio), c is a radius of a circle of confusion, and f is a focal length. It can be known from Mathematical Formula 1 that the depth of field is inversely proportional to a square of the focal length. Therefore, the metalens 10 has the advantage of a very long depth of field as applied to the image sensor 1. Based on the above, the metalens 10 may effectively focus the light onto the photosensitive device, thereby improving the photoelectric conversion efficiency of the image sensor 1.

$$DOF=2u^2Nc/f^2 \qquad \text{Mathematical formula 1}$$

Figure 3:
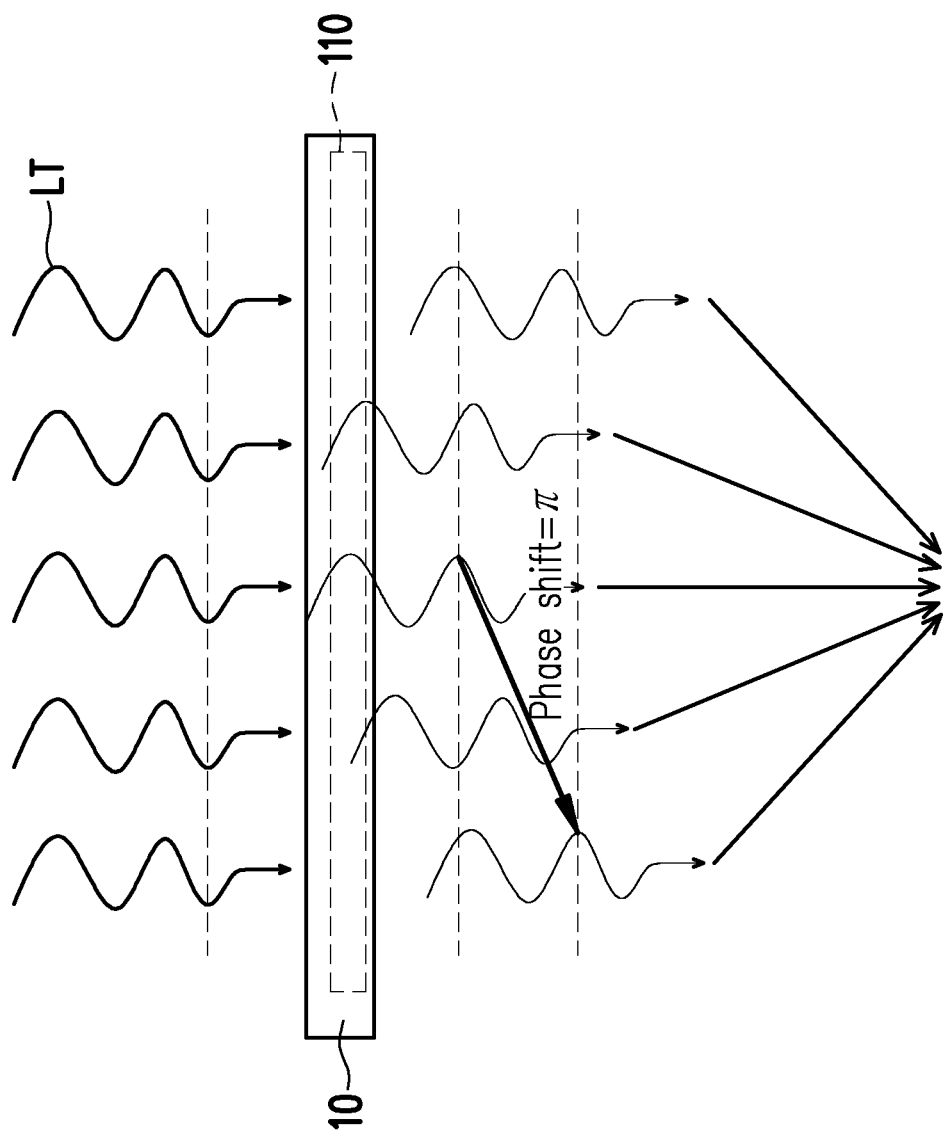
FIG. 3 is a cross-sectional schematic view of a metalens according to an embodiment of the disclosure when focusing light.

FIG. 3 is a cross-sectional schematic view of a metalens according to an embodiment of the disclosure when focusing light. Referring to FIG. 3, the metalens 10 deforms the wavefront of the light mainly by changing the phase of the light at different positions, so as to achieve the effect of focusing. For example, in FIG. 3, after light LT near an edge passes through the metalens 10, a phase of the wavefront of the light LT is shifted by π(pi=180°) compared with the light LT near the center. By modulating the phase of the wavefront of the light LT, the effect of focusing is achieved.

Figure 4:
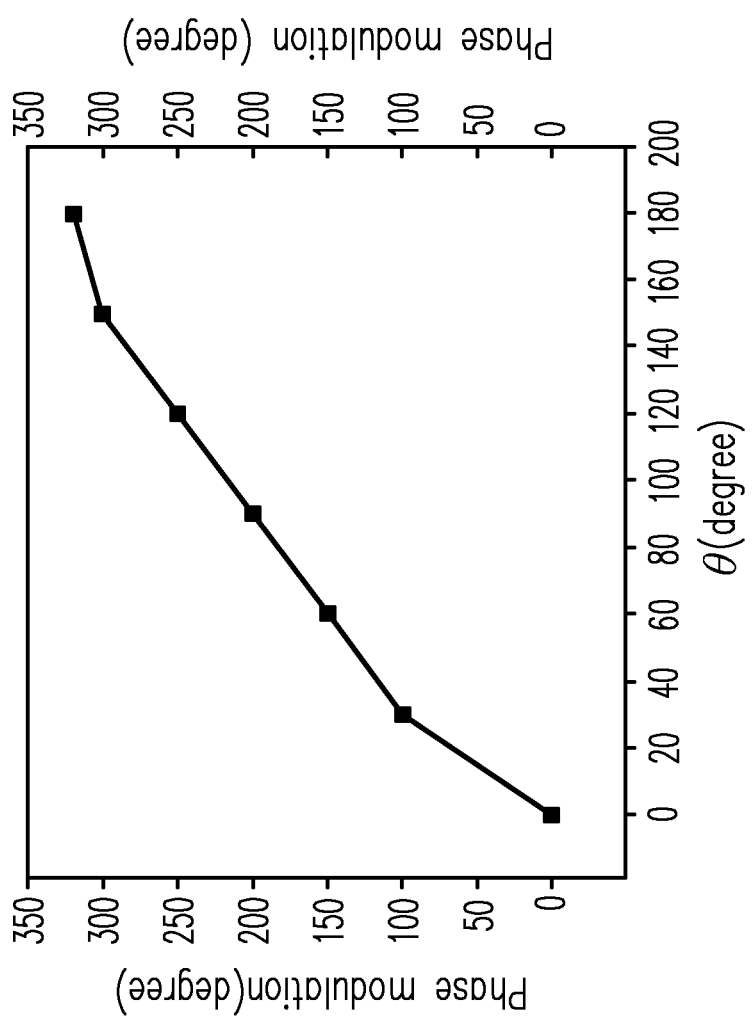
FIG. 4 is simulation data of rotation angle and phase modulation of a columnar microstructure of a metalens according to an embodiment of the disclosure.

FIG. 4 is simulation data of rotation angle and phase modulation of a columnar microstructure of a metalens according to an embodiment of the disclosure. In FIG. 4, a horizontal axis represents the rotating angle of the columnar microstructure, namely the included angle between the central axis of the rectangle of the columnar microstructure projected onto the transparent substrate and the dummy x-axis (e.g., the first included angle θ1 to the fourth included angle θ4 in FIG. 2B). The vertical axis represents the phase modulation amount of the light, namely the phase shifting amount of the wavefront. Referring to FIG. 4, the simulation is performed by finite-difference time-domain (FDTD) method, and the phase of the wavefront of the light is adjusted by changing the rotating angle of the columnar microstructure. Specifically, the phase of the wavefront of the light may be shifted by 0 to 300 degrees. In other words, the disclosure may change an incident angle of an incident ray to a predetermined area by controlling the rotating angle of the columnar microstructure, thereby achieving the effect of focusing. It should be noted that in response to the rotating angle exceeding 180 degrees, the phase of the wavefront of the light is modulated by the same amount as a modulation amount of a conjugate angle of the rotating angle. For example, the columnar microstructure with a rotating angle of 260 degrees has the same modulation amount of the phase of the wavefront as the columnar microstructure with a rotating angle of 80 degrees (equal to 260 degrees to 180 degrees).

In some embodiments, a columnar microstructure with various rotating angles is defined by a patterned hard mask layer (such as silicon dioxide) and a patterned photoresist layer. Specifically, a pattern of the hard mask layer and the photoresist layer is defined by a lithography process and an etching process, thereby obtaining a columnar microstructure with different rotating angles.

Figure 5:
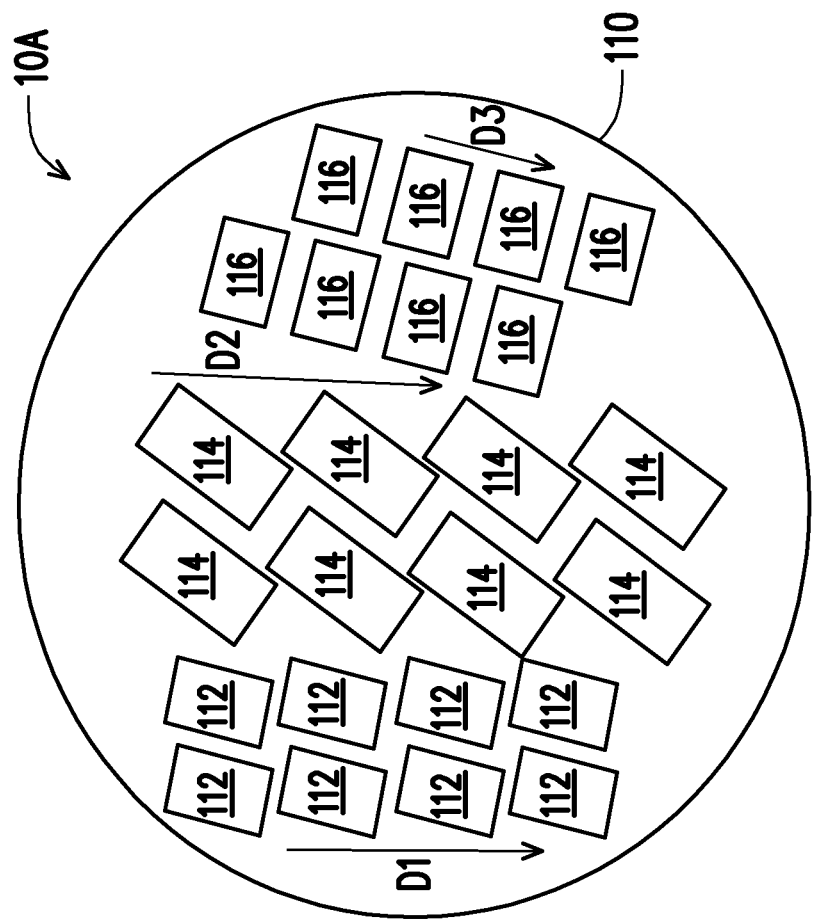
FIG. 5 is a schematic top view of a metalens according to an embodiment of the disclosure.

FIG. 5 is a schematic top view of a metalens according to an embodiment of the disclosure. It must be noted here that the element reference numerals and a portion of the contents of the embodiments of FIG. 2A and FIG. 2B are used in the embodiment of FIG. 5, the same or similar reference numerals are used to denote the same or similar elements, and the description of the same technical content is omitted. For the description of the omitted part, reference may be made to the foregoing embodiment, and details are not described herein.

Referring to FIG. 5, in this embodiment, a metalens 10A includes multiple rows of first columnar microstructures 112 continuously arranged along a first direction D1, multiple rows of second columnar microstructures 114 arranged continuously along a second direction D2, and multiple rows of third columnar microstructures 116 arranged continuously along a third direction D3. By adjusting the arrangement direction, the pitch, the height, the rotating angle, and/or the length of different rows of columnar microstructure, light of different wavelengths is directed to different positions, respectively. In some embodiments, the first columnar microstructure 112, the second columnar microstructure 114, and the third columnar microstructure 116 are respectively configured to direct light of different wavelengths to different positions. For example, the first columnar microstructure 112 is configured to direct red light to the photosensitive device PD1 (referring to FIG. 1), the second columnar microstructure 114 is configured to direct green light to the photosensitive device PD2 (referring to FIG. 1), and the third columnar microstructure 116 is configured to direct blue light to the photosensitive device PD3 (referring to FIG. 1).

What is claimed is:

1. A metalens, comprising:
a transparent substrate; and
a plurality of lenses, located on the transparent substrate, wherein each of the plurality of lenses comprises:
   a plurality of first columnar microstructures, arranged continuously along a first direction; and
   a plurality of second columnar microstructures, arranged continuously along a second direction, wherein a pitch of the plurality of first columnar microstructures is different from a pitch of the plurality of second columnar microstructures, wherein the first direction is not parallel to and not perpendicular to the second direction, a shape of an orthographic projection of each of the plurality of first columnar microstructures onto the transparent substrate is a first rectangle, a shape of an orthographic projection of each of the plurality of second columnar microstructures onto the transparent substrate is a second rectangle, and a length of the first rectangle is different from a length of the second rectangle.

2. The metalens according to claim 1, wherein a height of the plurality of first columnar microstructures is different from a height of the plurality of second columnar microstructures.

3. The metalens according to claim 1, wherein based on a dummy x-axis, a first included angle is provided between a central axis of each of the first rectangles and the dummy x-axis, a second included angle is provided between a central axis of each of the second rectangles and the dummy x-axis, wherein the first included angle is different from the second included angle.

4. The metalens according to claim 1, wherein each of the plurality of lenses further comprises:
a plurality of third columnar microstructures, arranged continuously along a third direction; and
a plurality of fourth columnar microstructures, arranged continuously along a fourth direction, wherein the pitch of the plurality of first columnar microstructures, the pitch of the plurality of second columnar microstructures, and a pitch of the plurality of third columnar microstructures are different from each other.

5. The metalens according to claim 4, wherein a pitch of the plurality of fourth columnar microstructures is equal to the pitch of the plurality of second columnar microstructures.

6. The metalens according to claim 4, wherein a height of the plurality of first columnar microstructures is equal to a height of the plurality of fourth columnar microstructures, and the height of the plurality of first columnar microstructures, a height of the plurality of second columnar microstructures, and a height of the plurality of third columnar microstructures are different from each other.

7. An image sensor, comprising:
the metalens according to claim 1; and
a photosensitive device substrate, overlapping the metalens.

8. The image sensor according to claim 7, wherein the photosensitive device substrate comprises a plurality of pixels, each of the pixels overlaps a corresponding lens, and each of the pixels comprises a plurality of photosensitive devices.

* * * * *